US010492362B2

(12) United States Patent
Albaek

(10) Patent No.: US 10,492,362 B2
(45) Date of Patent: Dec. 3, 2019

(54) APPARATUS FOR TREATING A LAWN SURFACE

(71) Applicant: ENGBAKKEN HOLDING 2012 APS, Marslev (DK)

(72) Inventor: Michael Albaek, Marslev (DK)

(73) Assignee: ENGBAKKEN HOLDING 2012 APS, Marslev (DK)

( * ) Notice: Subject to any disclaimer, the term of this patent is extended or adjusted under 35 U.S.C. 154(b) by 186 days.

(21) Appl. No.: 14/914,745

(22) PCT Filed: Aug. 27, 2014

(86) PCT No.: PCT/DK2014/050253
§ 371 (c)(1),
(2) Date: Feb. 26, 2016

(87) PCT Pub. No.: WO2015/028024
PCT Pub. Date: Mar. 5, 2015

(65) Prior Publication Data
US 2016/0205868 A1    Jul. 21, 2016

(30) Foreign Application Priority Data

Aug. 28, 2013   (DK) ................................. 2013 70469

(51) Int. Cl.
*A01D 34/52*        (2006.01)
*A01B 45/02*        (2006.01)
(Continued)

(52) U.S. Cl.
CPC .............. *A01D 34/52* (2013.01); *A01B 43/00* (2013.01); *A01B 45/026* (2013.01); *A01D 34/003* (2013.01); *A01D 34/62* (2013.01)

(58) Field of Classification Search
CPC ....... A01B 45/02; A01B 45/026; A01B 43/00; A01D 34/52; A01D 34/62; A01D 34/003
See application file for complete search history.

(56) References Cited

U.S. PATENT DOCUMENTS 1,454,668 A * 5/1923 Bugla .................... A01B 43/00
                                                         171/63
1,747,139 A * 2/1930 Mourar .................. A01B 43/00
                                                         171/85
(Continued)

FOREIGN PATENT DOCUMENTS

EP         0485916 A1     5/1992
EP         2596692 A1     5/2013
(Continued)

OTHER PUBLICATIONS

International Search Report and Written Opinion from International Application No. PCT/DK2014/050253, dated Nov. 18, 2014.

*Primary Examiner* — Jessica H Lutz
(74) *Attorney, Agent, or Firm* — Merchant & Gould P.C.

(57) ABSTRACT

An apparatus for surface treatment and collection of undesirable debris from lawns. During a cutting operation, rotating blades ripe surface material from soil up onto a filtering screen and along this further to a collecting box so that only stones and debris of e.g. at least 1 cm enter the box whereas smaller particles/soil escape through the filter screen and are thereby returned to the lawn surface, which significantly increases the nutrient level in the upper layers of the lawn.

10 Claims, 1 Drawing Sheet

(51) Int. Cl.
*A01D 34/00* (2006.01)
*A01D 34/62* (2006.01)
*A01B 43/00* (2006.01)

(56) References Cited

U.S. PATENT DOCUMENTS

| | | | | |
|---|---|---|---|---|
| 2,924,284 A * | 2/1960 | Cykler | ................... | A01B 43/00 171/63 |
| 3,556,223 A * | 1/1971 | Pardy | ................... | A01B 43/00 171/85 |
| 4,005,755 A * | 2/1977 | Bakke | ................... | A01B 43/00 171/13 |
| 4,609,050 A * | 9/1986 | Jacobs | ................ | A01D 25/048 171/101 |
| 5,036,651 A * | 8/1991 | Nelson | .................. | A01D 43/02 172/21 |
| 5,036,652 A * | 8/1991 | Schmittbetz | ........... | A01D 43/00 460/114 |
| 5,816,336 A * | 10/1998 | Underhill | ............... | A01B 45/02 172/22 |
| 6,321,849 B1 * | 11/2001 | Underhill | ............... | A01B 45/02 172/22 |
| 7,163,067 B2 * | 1/2007 | Job | ...................... | A01B 45/026 172/21 |
| 2002/0056555 A1 * | 5/2002 | Underhill | ............... | A01B 45/02 172/22 |
| 2004/0221999 A1 * | 11/2004 | Stevens | .................. | A01B 35/14 171/2 |
| 2008/0164040 A1 * | 7/2008 | Kraaijeveld | ......... | A01B 45/026 172/21 |
| 2010/0116516 A1 * | 5/2010 | Gerber | .................. | A01B 43/00 172/32 |

FOREIGN PATENT DOCUMENTS

GB  2019706 A  11/1979
NL  1006203 CI  12/1998

* cited by examiner

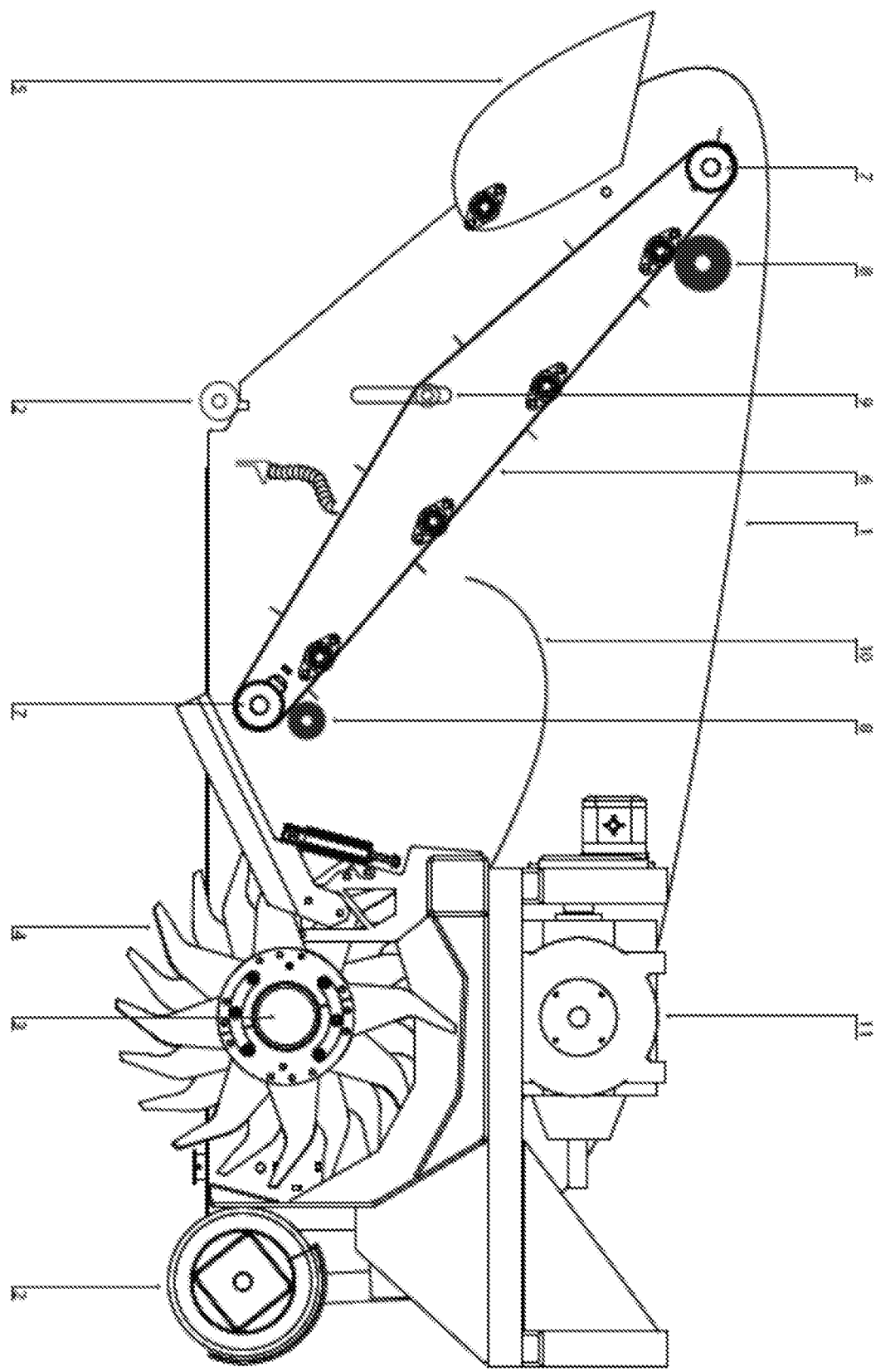

APPARATUS FOR TREATING A LAWN SURFACE

This application is a National Stage Application of International Application No. PCT/DK2014/050253, filed 27 Aug. 2014, which claims benefit of Serial No. PA 2013 70469, filed 28 Aug. 2013 in Denmark and which applications are incorporated herein by reference. To the extent appropriate, a claim of priority is made to each of the above disclosed applications.

FIELD OF THE INVENTION

The present invention relates to an apparatus for surface treatment and collection of undesirable debris of a defined nature from lawns.

BACKGROUND OF THE INVENTION

Sweeping, cutting, and clearing of lawns may involve the gathering of stones and similar debris from an expanse of terrain, made up of lawn, grass, gravel or other surfaces of a compliant and movable nature.

In addition to traditional sweeping tools, a range of powered blowers and vacuum systems are attracting increased use. In addition to all the above, some unique systems have been developed involving the careful and selective gathering of stone and debris using innovative mechanics. This selective gathering of such debris from such surfaces can be accomplished by the use of spikes which pierce a wide range of debris where the spikes readily transverse or enter the surface of the terrain.

A vertical cutter is typically used for treating a lawn or green around a hole on a golf course. The character of golf demands that the green offers the least possible resistance to the movement of the golf balls and that this resistance furthermore is constant to the greatest possible extent. However, grass is a living organism that grows and therefore is likely to change texture depending on the weather and local growing conditions. Therefore, it is necessary to cut the grass frequently to e. g. a height of 3 mm.

The cut grass and other plant material will lie as a mat layer of a thickness of for example a couple of millimetres on the ground. This mat layer is bad for the free access of air, water and light to the roots of the grass. Thereby, the growing conditions of the grass are deteriorated, the result of which is that the green eventually will not be able to meet the required standard.

To solve this problem the mat layer is therefore normally cut through by means of a vertical cutter during which possible offshoots also are cut. A conventional vertical cutter with front mounted collecting box and guide screen behind the vertical cutting blades will however only be able to throw a small part of the loosened mat up on the guide screen and along this further to the collecting box. The rest will remain lying on the ground and has to be removed in a separate operation, for example by driving across the green one more time with a rotating brush for sweeping up the material.

Conventionally, expensive additional operations are therefore required after the above primary treatment of the green. These additional operations considerably increase the costs of maintaining the green. Moreover, conventional grass treatment devices do not sufficiently cope with the problem of low soil nutrient levels.

It is known from EP2596692 how to aerate a grass strip with an apparatus comprising a rotating shaft which is provided along its length with a number of aerating blades which are at right angles to the shaft and designed to loosen and remove parts of the grass strip. The apparatus is provided with a guide device for collecting the material loosened by the aerating blades and discharging it in the direction of a collecting device. The loosened material is partly sieved through roller bodies while it is being discharged. The working depth (depth to which the blades are pushed into the ground during use) of the blades is adjustable and varies between 0 and 3 mm. During aeration, not only is plant material removed, but some soil and sand will be carried along with the loosened stream of material. Although the apparatus disclosed in EP2596692 loosen some soil in the very upper soil layer the very aim of the apparatus is to aerate a green. EP2596692 fails to solve the problem of low soil nutrient levels.

The disadvantages of the conventionally used methods for treating a lawn are attempted to be remedied by the present invention.

SUMMARY OF THE INVENTION

The present invention solves the problems of conventional lawn treatment devices by designing long vertical cutting rotor blades. During a cutting operation, the rotating blades ripe surface material (soil, stone, debris, grass) up onto a filtering screen and along this further to a collecting box so that only stones and debris of e.g. at least 1 cm enter the box whereas smaller particles/soil escape through the filter screen and are thereby returned to the lawn surface, which significantly increases the nutrient level in the upper layers of the lawn.

Specifically the present invention provides an apparatus for treating a lawn, for example a green, comprising: a frame with one or more drums or wheels enabling the apparatus to move over the lawn; a shaft rotatably mounted on the frame at a distance above the lawn and oriented mainly crosswise to the direction of motion; a cutting means having a number of vertical cutting blades non rotatably mounted with spacing on the rotatable shaft; a container for receiving debris and stones; an inclined endless meshed conveyor screen mounted on two rotating bars, said screen placed with its lower end at the cutting means and its upper end at the container; wherein the conveyor screen is inclined in an angle ranging from 5 to 70 degrees, preferably 30 to 60 degrees. It is important that the conveyor screen is meshed (i.e. a net/filter) in order to let nutritious soil return to the lawn through the meshes, while undesired debris/stone is retained.

Preferably, the rotating blades are sufficiently long to cut 5-30 cm into the soil layer of the lawn surface. The present inventor has surprisingly found that by utilizing such long blades the treatment of the grass is significantly improved due to the mixing of soil components and nutrients originating from various depths of the soil (soil from layers in 5-30 cm depth is mixed with soil from 0-5 cm depth) which result in a major improvement of the green. Conventional vertical cutters and aerators (as in the above mentioned EP2596692) are not designed to reach such soil layers (due to shorter blades) and they would not be able to properly sieve the soil (with stones and debris) from deeper layers. In this respect the roller bodies would not be able to transport larger soil components, such as heavy stone etc.

In a preferred embodiment the conveyor screen is provided with carriers preventing great pieces or stones from not rolling back on the screen.

In another preferred embodiment the invention includes cleaning means, such as rotating brushes, are provided at the conveyor screen to remove any accumulated soil or dirt.

In order to achieve an efficient filtering of soil, debris, and small stones (crabbles) the apparatus further comprises means for vibrating the screen.

It is also preferred that the conveyor is looped around a set of drive pinions at a first end and a set of slave pinions at a second end. Finally it is preferred that a baffle is provided in the first end of the conveyor to dislodge accumulated debris or soil.

BRIEF DESCRIPTION OF THE DRAWING

FIG. 1 shows an overall view of the apparatus of the invention.

DETAILED DESCRIPTION OF THE INVENTION

As mentioned above the present invention solves the problems of conventional lawn treatment devices. This is partly due to the long vertical cutting rotor blades and partly due to the filtering screen, which let nutritious soil particles enter the surface of the lawn thereby increasing the nutrition level of the upper soil layer. This is because the blades cut soil pieces from lower layers which are then transported onto the filtering screen (conveyor screen) and returned to the uppermost layer of the lawn; this ensures high concentrations of important soil nutrients and minerals. Hence, during the cutting operation, the rotating blades ripe material up onto a filtering screen and further to a collecting box so that only stones and debris of e.g. at least 1 cm center the box whereas smaller particles/soil escape through the filter screen and are thereby returned to the lawn surface, which significantly increases the nutrient level in the upper layers of the lawn. Accordingly, the apparatus is able to increase the concentration of important soil components, minerals etc in the surface layer of the lawn thereby improving the overall quality and look of the lawn. Obviously, this is important for e.g. golf courses.

The invention will now be described with reference to FIG. 1, which shows an overall view of the components of the apparatus of the invention, namely a frame (1) with one or more drums (2) or wheels enabling the apparatus to move over the lawn; a shaft (3) rotatably mounted on the frame (1) at a distance above the lawn and oriented mainly crosswise to the direction of motion; a cutting means having a number of vertical cutting blades (4) non-rotatably mounted with spacing on the rotatable shaft; a container (5) for receiving debris and stones; an inclined endless conveyor screen (6) mounted on two rotating bars or pinions (7), said screen placed with its lower end at the cutting means (4) and its upper end at the container (5); wherein the conveyor screen (6) is inclined in an angle ranging from 5 to 70 degrees, preferably 30 to 60 degrees. In order to rotate the cutting blades there is provided a high power engine (11) that is able to rotate the shaft (3) with at least 300 rpm.

Preferably, the rotating blades (4) are sufficiently long to cut 5-30 cm into the soil layer of the lawn surface.

In a preferred embodiment the conveyor screen (6) is provided with carriers preventing great pieces or stones from not rolling back on the screen.

In another preferred embodiment the invention includes cleaning means (8), such as rotating brushes, are provided at the conveyor screen to remove any accumulated soil or dirt.

In order to achieve an efficient filtering of soil, debris, and small stones (crabbles) the apparatus further comprises means for vibrating (9) the screen.

It is also preferred that the conveyor is looped around a set of drive pinions at a first end and a set of slave pinions at a second end. Finally it is preferred that a baffle (10) is provided at the first end of the conveyor to dislodge accumulated debris or soil.

The invention provides for the first time, a highly efficient and user-friendly device for operation over a wide range of terrain. The device of the invention provides many advantages over commonly available grass treatment devices. In addition to the devices ability to gather and collect debris as well as increasing the nutrient level in the soil, it also functions to aerate lawns as a second action of the blades vertically cutting the surface of the lawn. The selective action of the device does not interfere with lose terrain including gravel, dust, dirt, pebbles etc. The device can be used in all weather conditions and is not restricted to dry weather as it can readily be used after rain.

The invention claimed is:

1. An apparatus for treating a lawn comprising:
   a frame with one or more drums or wheels enabling the apparatus to move over the lawn in a first direction, wherein the one or more drums or wheels rotate in a first rotational direction so that the apparatus moves in the first direction;
   a shaft rotatably mounted on the frame at a distance above the lawn and oriented mainly crosswise to a direction of motion, said shaft being rotated by an engine;
   a cutting means having a number of vertical cutting blades non rotatably mounted with spacing on the rotatable shaft, wherein the blades are sufficiently long to cut 5-30 cm into a soil layer of the lawn surface;
   a container for receiving debris and stones; and
   an inclined endless meshed conveyor screen mounted on two rotating bars, said screen placed with its lower end at the cutting means and its upper end at the container; wherein the conveyor screen is inclined in an angle ranging from 5 to 70 degrees, and
   wherein, during operation of the apparatus for treating a lawn when the apparatus moves in the first direction, the shaft rotatably mounted on the frame rotates in the first rotational direction so that the vertical cutting blades lift portions of the soil layer onto the lower end of the inclined endless meshed conveyor screen.

2. The apparatus according to claim 1, wherein the conveyor screen is provided with carriers preventing great pieces or stones from not rolling back on the screen.

3. The apparatus according to claim 1, wherein cleaning means are provided at the conveyor screen to remove any accumulated soil or dirt.

4. The apparatus according to claim 1 further comprising means for vibrating the screen.

5. The apparatus according to claim 1, wherein said conveyor is looped around a set of drive pinions at a first end and a set of slave pinions at a second end.

6. The apparatus according to claim 1, wherein a baffle is provided in the first end of the conveyor to dislodge accumulated debris or soil.

7. The apparatus according to claim 1, wherein the mesh size of the screen ranges from at least 0.2 cm up to 2 cm.

8. The apparatus according to claim 1, wherein the conveyor screen is inclined in an angle ranging from 30 to 60 degrees.

9. The apparatus according to claim 1, wherein the mesh size of the screen ranges from at least 1 cm up to 2 cm.

10. The apparatus according to claim 3, wherein the cleaning means comprises rotating brushes.

* * * * *

UNITED STATES PATENT AND TRADEMARK OFFICE
CERTIFICATE OF CORRECTION

PATENT NO. : 10,492,362 B2
APPLICATION NO. : 14/914745
DATED : December 3, 2019
INVENTOR(S) : Michael Albaek It is certified that error appears in the above-identified patent and that said Letters Patent is hereby corrected as shown below:

On the Title Page

(30) Foreign Application Priority Data: "Aug. 28, 2013 (DK) 2013 70469" should read
-- Aug. 28, 2013 (DK) PA 2013 70469 --

Signed and Sealed this
Twenty-fifth Day of February, 2020

Andrei Iancu
*Director of the United States Patent and Trademark Office*